(12) United States Patent
Lekar

(10) Patent No.: US 7,581,775 B2
(45) Date of Patent: Sep. 1, 2009

(54) SIDE WINDOW ROLLER BLIND

(75) Inventor: Jan Lekar, Reichenbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/890,943

(22) Filed: Aug. 8, 2007

(65) Prior Publication Data

US 2008/0053630 A1 Mar. 6, 2008

(30) Foreign Application Priority Data

Aug. 29, 2006 (DE) ................. 10 2006 040 317

(51) Int. Cl.
*B60J 3/02* (2006.01)
(52) U.S. Cl. ..................... 296/97.8; 160/314
(58) Field of Classification Search ............. 296/97.8, 296/97.4, 97.1, 97.7, 141, 142, 143; 160/313, 160/314, 315, 262
See application file for complete search history.

(56) References Cited

U.S. PATENT DOCUMENTS

| 483,382 | A | * | 9/1892 | Jones | ................. 160/290.1 |
| 1,569,118 | A | | 1/1926 | Curtis | |
| 1,800,654 | A | * | 4/1931 | Nelson | ................. 160/262 |
| 3,075,805 | A | * | 1/1963 | Golde et al. | ................. 296/98 |
| 6,086,133 | A | | 7/2000 | Alonso | |
| 6,910,518 | B2 | * | 6/2005 | Zimmermann et al. | . 160/370.22 |

FOREIGN PATENT DOCUMENTS

| DE | 513642 C | 12/1930 |
| DE | 8812294 U1 | 3/1989 |
| DE | 198 06 736 | 8/1999 |
| DE | 103 19 294 | 12/2004 |
| DE | 10 2004 024 682 | 12/2005 |
| EP | 1445134 A1 | 8/2004 |
| FR | 2620981 A * | 3/1989 |

OTHER PUBLICATIONS

Machine translation of FR2620981.*
German Search Report, May 20, 2009.

* cited by examiner

*Primary Examiner*—Dennis H Pedder
*Assistant Examiner*—Melissa A Black
(74) *Attorney, Agent, or Firm*—Leydig, Voit & Mayer, Ltd.

(57) ABSTRACT

A roller blind for a side window of a motor vehicle. The roller blind has a winding shaft, which is coupled via an articulated or flexible coupling mechanism to a spring drive situated outside the winding shaft. The winding shaft and the spring drive are accommodated inside a vertical window frame segment of a motor vehicle's window. The articulated or flexible coupling between the winding shaft and the spring drive makes it possible to approximate a curved path by means of two normally straight elements of the blind. Furthermore, a very flat characteristic tension curve can be achieved for the spring drive, even when the winding shaft is very short.

28 Claims, 2 Drawing Sheets

SIDE WINDOW ROLLER BLIND

FIELD OF THE INVENTION

The present invention relates to window roller blinds for motor vehicles, and more particularly, to a roller blind particularly adapted for use with side windows of a motor vehicle.

BACKGROUND OF THE INVENTION

In order to protect the driver of a motor vehicle from glaring sunlight, it is known how to use sunscreens in the area of the front windshield. These are flipped down from the roof. The sunscreens can also often swivel about a vertical axis so that they can be turned toward the side window pane when the sun is shining at the side. There is a need, however, for a sun screen device that is more effective in the area of the side window. Conventional roller blinds cannot be used for side windows in the front of the vehicle. According to the regulations, a side window can be screened by not more than 20-40% of the total window height from the top down.

The space conditions for installation of roller blinds at front side windows also are quite limited because designers like to keep the window frame of the door as narrow as possible. Additional problems result from the somewhat curved course of the rear edge of the window frame or a course not perpendicular to the adjoining region of the upper edge of the window.

Hence, from the foregoing, it can be seen that a number of not insignificant problems exist for the designer of side window roller blinds.

OBJECTS AND SUMMARY OF THE INVENTION

It is an object of the present invention is to provide a side window roller blind for motor vehicles that satisfies design regulations and that can be effectively placed in the window frame of the vehicle door.

The side window roller blind of the invention can be accommodated in the region of the front side window of the motor vehicle, i.e., in the region of the front doors. These windows are bounded by a top edge as well as a rear side edge. The front side edge generally merges with the top edge by a gentle curve without producing a distinct corner.

On the other hand, a distinct inner edge can be found at the transition to the rear window edge. These two edges make an angle with each other that depends on the remainder of the car body design.

The novel side window roller blind has a winding shaft which is arranged adjacent to the window side edge and the window top edge. The axis of the winding shaft runs, at least approximately, parallel to the rear window side edge. The length of the winding shaft is shorter than the length of the window side edge.

A blind sheet is fastened to the winding shaft at one edge. In order to keep the blind sheet taut in the extended condition or to wind it up on the winding shaft, a spring drive is provided, formed by a helical spring. The helical spring is situated outside the winding shaft and is kinematically joined to the winding shaft by a coupling mechanism.

Due to this spatial separation of winding shaft and helical spring, it becomes possible to use helical springs that are sufficiently long to accommodate the large number of revolutions needed to apply a usable force over the entire operating length of the blind sheet.

In selecting the dimensions of the spring drive, the spring drive should have the flattest possible tension characteristic curve so that a sufficient tension is still present in the retracted condition, while in the extended condition the tension should not increase excessively. Consequently, the spring can have a very long possible stroke, in relation to the utilized stroke, with the utilized stroke lying in the middle region of the theoretically possible stroke. In one practical embodiment, the spring drive is approximately twice as long as the winding shaft.

The axial spatial separation of spring drive and winding shaft, moreover, allows an easy adjustment to the somewhat bent course of the outer frame contour, i.e., the course between the inner edge of the window frame and the rear edge of the door. Depending on the height of the window and the permitted shading, the length of the winding shaft is between 10% and 40% of the length of the window side edge.

Depending on the geometrical circumstances in the region of the top edge of the window, it may be advisable for the winding shaft to have the shape of a truncated cone with a small conical angle. In this way, it is possible to achieve the most seamless adjustment of the edge of the roller blind to the top edge of the window. Because of the force relationship within the blind sheet, it is generally not possible to use the side edges of the blind sheet, which are distinctly convex curved. The convex region projecting far beyond an, approximately straight line would have a tendency to slacken and the motion of the vehicle would make it flap around.

In the case of most vehicle geometries, the thinner end of the truncated conical winding shaft is generally facing the top edge of the window. The blind sheet has approximately the shape of an acute triangle in order to achieve the best possible shading effect. An aesthetically pleasing appearance results when the winding shaft is accommodated inside the window frame, i.e., inside the door panel.

In the simplest case, the side window roller blind is a manual roller blind. In this case, an anchoring mechanism is provided at a location away from the winding shaft in a region where the window top edge passes, into the front edge. This anchoring mechanism corresponds to an anchoring mechanism provided on the blind sheet so that the blind can be hung or fastened there in the extended condition. A handle is provided at the vertex of the blind sheet in order to operate or hang the blind sheet.

It will be seen that the side roller blind of the invention can also be electrically operated in a usual manner. For this, a guide rail can be provided in the region of the top edge of the window, in which a sliding or guiding mechanism travels, being connected by its free end to the roller blind. A manual roller blind can likewise be provided with such a guide mechanism, for which the sliding mechanism is then provided with a brake device, so that the blind sheet can be positioned with the free edge in any desired location.

The preliminary and final installations by an auto maker are facilitated when the helical spring of the spring drive is coordinated with a housing. In the most simple case, this housing can be tubular. It is beneficial for the tubular housing to be cup like in the sense that it is closed off at the lower end. In this way, on the one hand, the winding shaft is very well protected and, on the other hand, a dampening fluid can be filled inside the housing, which prevents rattling noises from being created by the helical spring on account of the vehicle movements. Another source of rattling noises is from the force produced when shutting the door. This force can be as high as 15 G so that the parts of the side window roller blind arranged in the region of the window rear edge need to be appropriately sturdy in construction.

Very simple installation is possible when the spring is configured as a helical tension spring and is provided with a bearing mounted in the housing at its take-off end. The length of the helical tension spring is necessarily dictated by the housing, which prevents tensile forces on the winding shaft. At the same time, a rather complete sealing can be achieved due to the bearing piece with a cuplike housing.

The coupling mechanism between the take-off end of the helical spring and the winding shaft is preferably articulated or flexible in the sense that the axis of the take-off end and the axis of the winding shaft can travel at a bend relative to each other. Joints of this kind, for example, Cardan joints or universal joints, are relatively expensive for this simple application. More simple examples are connections in the manner of a Hardy disk or flexible shaft. One of the simplest connections is a coupling consisting of two catches, one being in the shape of an eyelet and the other in the shape of a hook fitted into the eyelet. Because of the spring drive this connection is constantly tensioned in one direction, hence, rattle free.

Other objects and advantages of the invention will become apparent upon reading the following detailed description and upon reference to the drawings, in which:

DETAILED DESCRIPTION OF THE INVENTION

Figure 1:
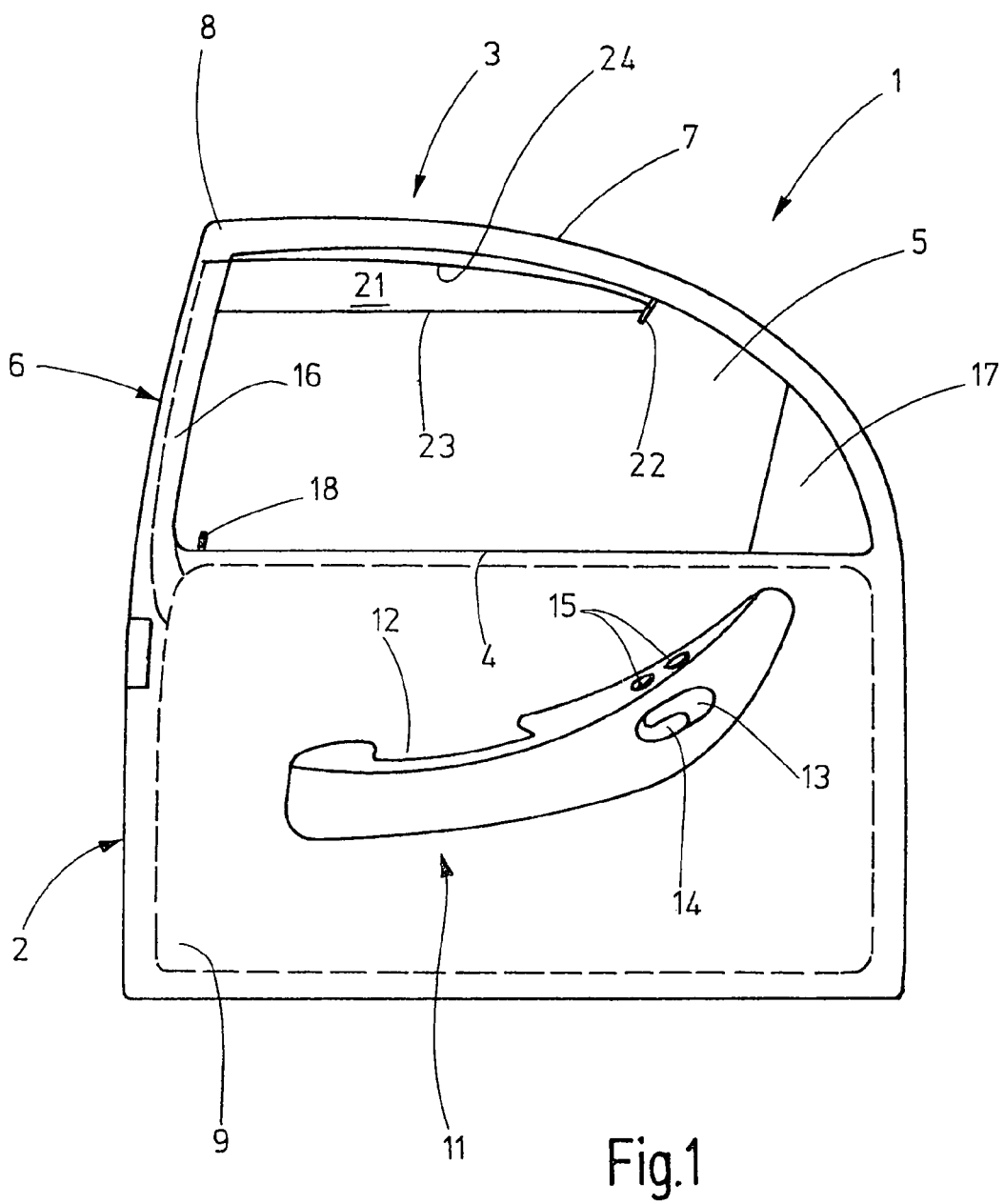
FIG. 1 is a side elevational view of the door of a motor vehicle, looking at the inside, having a window roller blind in accordance with the invention.

Referring now more particularly to FIG. 1 of the drawings, there is shown a left front door of a motor vehicle having a side window roller blind in accordance with the invention. The vehicle has a lower door body 2 over which an arc-shaped window frame 3 is provided. The window frame 3, together with a top edge 4 of the body 2, borders a window opening 5. The frame 3 is divided into a rear frame piece or segment 6 and a top frame piece or segment 7, merging one into the other at an inner corner 8. The rear frame segment 6 leads from the inner corner 8 to the top edge 4 of the door body 2 and there enters into the body 2. The upper frame segment 7 leads from the inner corner 8 to the front edge of the door and travels in an arc before it likewise enters into the body 2.

The terms frame and body, as used herein, refer to the hollow shaped structures in which the individual door installation parts, such as loudspeakers, locks, power window operator, glass panes, and the like, are mounted and guided, without hereafter differentiating between the load-bearing sheet metal bodywork and any interior paneling which may be present. It is understood by a person skilled in the art that both the window frame and the body are hollow in configuration.

The inner side of the door body 2, as viewed in FIG. 1, is formed by an interior paneling 9, on which a door handle arrangement 11 is fastened. The door handle arrangement 11 has a handle pocket 12, a lock activating lever 14 swingingly mounted in a pocket 13, and switches 15 that can be used to move or operate window panes, mirrors, seats, and the like. An additional strip-like interior paneling 16 in this case is provided on the inside of the rear frame segment 6.

In the region of the front part of the window cutout 5 there is a filler plate 17 on which an outer mirror is placed in normal fashion on the outside and in which there is arranged a guide rail for a pane of window glass, not otherwise visible. A corresponding guide rail is situated in the rear frame segment 6. The guide rails, as indicated above, extend into the body 2. Finally, on the top side 4 of the body 2 a retractable pin 18 is provided, which serves as a door locking knob and indicates the closed condition of the door lock.

The illustrated front door 1 is provided with a side window roller blind 20 in accordance with the invention (FIG. 2), having blind sheet or shade 21, which is shown pulled out in FIG. 1. The blind sheet 21, as can be seen, has a roughly triangular shape, the broad end being located at the rear window frame segment 6, while the vertex is provided with a gripping flap 22 and can be hung in a hook or pin on the underside of the top window frame segment 7 in a manner as will become apparent. The blind sheet 21 is bounded by two edges 23, 24, of which at least the edge 23 is exactly straight, while the edge 24 runs almost straight or totally straight.

In the opened condition, as is shown in FIG. 1, the blind sheet 21 next to the inside of the window pane extends just below the horizontally running segment of the top window frame segment 7, and little or no space remains between its lower edge and the edge of the blind sheet 24. The lower edge 23 runs generally parallel to the top edge 4 of the body 2, and at such a distance from it that the area permitted by design regulations remains open for an unhindered view of the outside.

The blind sheet 21 is pulled out through a slit located next to the inside of the window pane and emerges from the inner corner 8. The slit is formed in the interior paneling 6 as a recess.

Figure 2:
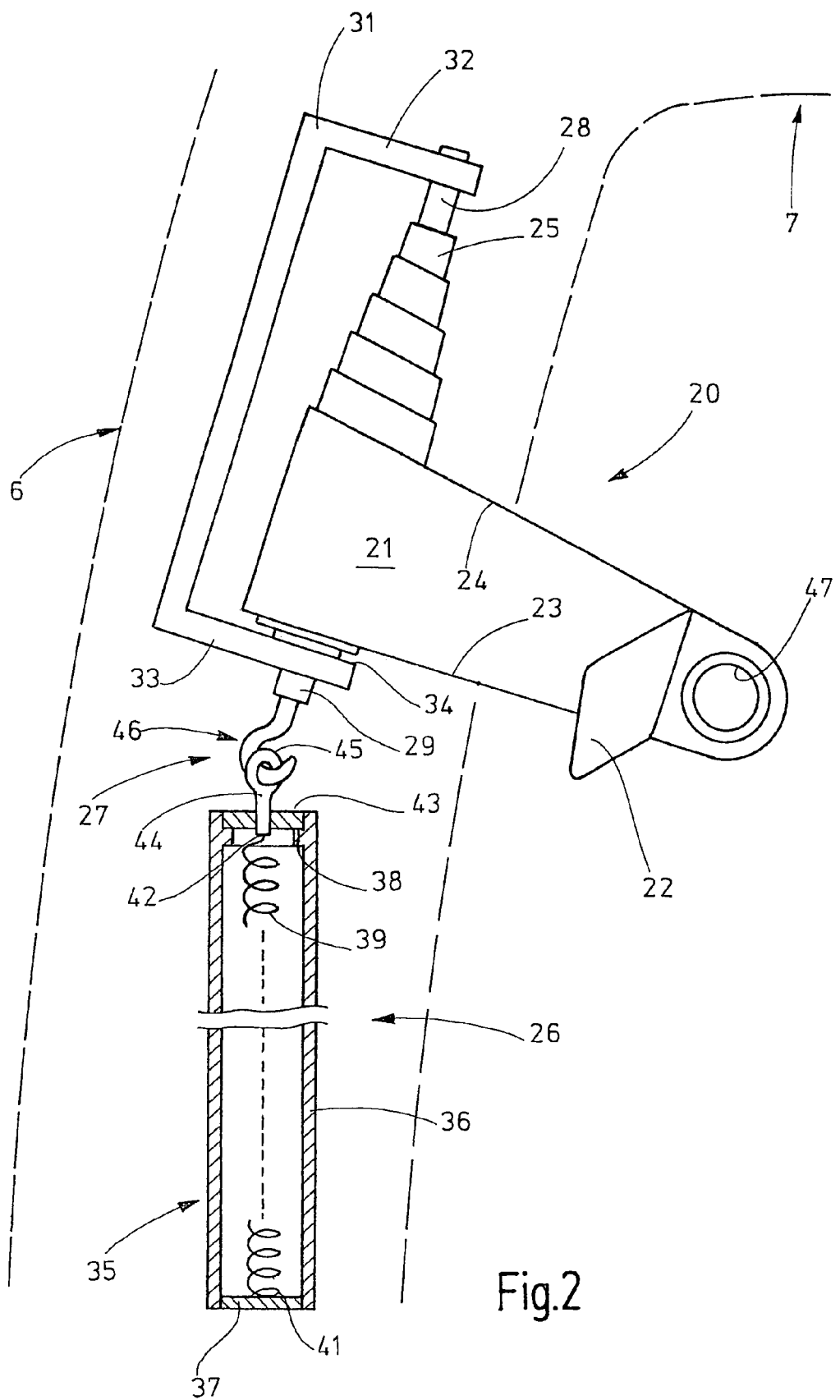
FIG. 2 is an enlarged, partly perspective, of the illustrated side window roller blind.

The structure of the side window roller blind 20 is shown by FIG. 2. As can be seen there, the side window roller blind 20 comprises a winding shaft 25, as well as a spring drive arrangement 26, which is coupled to the winding shaft 25, free of twisting, by a coupling mechanism 27. It will be understood that the representation of the structure of the side window roller blind 20 is simplified to bring out the essential details. Fasteners, screws, brackets, and the like, which are not necessary for an understanding of the invention, have been omitted so as not to clutter the drawing with too many details. The specific appropriate fastening means that are necessary would be understood by a person skilled in the art.

The winding shaft 25 has a truncated conical shape, to which one edge of the triangular shaped blind sheet 21 is secured. At the two axial ends of the winding shaft 25 there are bearing pivotal extensions 28, 29. By means of the two bearing pivotal extensions 28, 29, the winding shaft 25 is rotatably mounted in a bearing pedestal 31. The bearing pedestal 31 has a U-shaped form with two legs 32, 33, which contain bearing boreholes aligned with each other, in which the bearing pivotal extensions 28, 29 are received and can turn. The bearing pedestal 31 is appropriately secured to a load-bearing sheet steel part of the frame segment 6, which is illustrated by broken lines in FIG. 2. In the top region, the frame segment 6 merges into the frame segment 7, which is likewise shown with its bottom edge as a broken line in FIG. 2. In order to facilitate easy turning of the winding shaft 25 in the bearing pedestal 31, a thrust washer 34 is installed at the bottom end.

The spring drive 26 serves to keep the blind sheet 21 taut and to wind the blind sheet up on the winding shaft 25 when the user has released the anchoring between the blind sheet 21 and the window frame segment 7. The spring drive 26 includes a cuplike housing 35 with a cylindrical sidewall 36 and a bottom 37. At the top end, the cuplike housing 35 forms an inwardly projecting bearing collar 38. The housing 35 is connected in a suitable manner, e.g., by means of molded-on brackets, to the load-bearing bodywork part of the door 1.

Inside the cuplike or tubular housing 35 there is a helical tension spring 39. Its lower end is connected at a securement location 41 to the bottom 37 free of tension and twisting. Its other end 42 forms the take-off end, which is anchored coaxially with respect to the housing 35 in a bearing disk 43. The helical tension spring 39 runs essentially coaxially through the interior of the cuplike housing 35.

The bearing disk 43 is connected, free of twisting and axially immovable, to the take-off end 42 of the helical tension spring 39. The take-off end 42 is joined, free of twisting and tension, to a shaft 44 of an eyelet 45, representing one part or half of the articulated coupling mechanism 27.

Due to the prestressing force of the helical tension spring 39, the bearing disk 43 is axially pressed against the inwardly projecting collar 38. The collar 38 absorbs the tensile force emanating from the tension spring 39.

The eyelet 45 can turn relative to the housing 35, and the turning axis is parallel to the lengthwise axis of the housing 35. The lower bearing pivot 29 is provided with a hook 46 which, as shown, is hung in the eyelet 45 and forms the second part of half of the coupling mechanism 27.

The coupling mechanism 27, which consists of the hook 46 and the eyelet 45, is articulated in such a way that the axes of rotation of these two parts can change and form an angle other than 180 degrees with each other. Furthermore, the two coupling parts or halves are easy to separate from each other and to engage with each other. The hook 46 can have any desired play in the eyelet 45, and by reason of the prestressing of the spring drive 26, the coupling mechanism 27 is constantly prestressed in this same direction. Thus, no rattling noises can be produced. Preferably, the housing 35 also is fluid-tight at the bottom, and housing can be filled with a dampening fluid for preventing the occurrence of vibrations in the helical tension spring 39 which would cause the spring to produce irritating noises.

The operation of the side window roller blind 20 is as follows:

In the rest state, the blind sheet 21 is completely wound onto the winding shaft 25 by the action of the spring drive 26. The gripping flap 22, which stands out, forms a mechanical stop preventing the blind sheet from disappearing entirely in the frame segment 6. Furthermore, the gripping flap 22 forms the stop that thus limits the rotary movement of the winding shaft 25 and prevents the spring drive 26 from completely relaxing. For this, the gripping flap 22 lies against the aforementioned slit edge.

When the user wants to unfurl the side window roller blind 20, he merely grabs the gripping flap 22 by hand and guides the gripping flap 22 from the rear frame segment 6 into the region of the front part of the top frame segment 7 at a place where a corresponding hook or pin 48 is located. The user hangs the tapering blind sheet 21 on this pin, using the eyelet 47 located there. During this pulling-out motion, the blind shaft 25 rotates and continues to tighten the spring drive 26.

Because of the length of the window in the region of the blind sheet 21, between 8 and 15 revolutions are needed to extend the sheet, depending on the output diameter of the winding shaft 25. Such high number of revolutions requires a helical tension spring 39 with a length that can not be accommodated within the winding shaft 25 in a conventional manner. Therefore, the spring drive 26 is situated totally outside the winding shaft 25, which furthermore allows for a better adaptation to the complicated geometry of the door. In particular, it becomes possible to use a very long spring 39, enabling a very flat tension characteristic curve for the spring.

Due to the articulated coupling 27, whose axes of rotation can be angled relative to each other, the practitioner furthermore, has greater freedom when installing the side window roller blind. The rather long formation of winding shaft and spring drive no longer needs to be arranged on a single straight line. Instead, it is possible to arrange the axes of the spring drive and the winding shaft at an angle to each other and thus approximate a curved arc.

It should be understood that the length of the spring drive 26, in terms of the length of the winding shaft 25, is not drawn to scale in FIG. 2. The spring drive preferably is more than twice as long as the winding shaft.

Instead of the articulated form-fitting coupling mechanism 27, an appropriate short flexible shaft alternatively can be used. More elaborate linkages, such as Cardan joints and the like, for example, Hardy disks, etc., can likewise be employed.

Since the present invention basically deals with the nature of the drive of the winding shaft, it is not necessary to show in detail that, instead of moving the vertex of the blind sheet manually by the gripping flap 22, it can also be operated electrically. For this purpose, for example, a corresponding guide rail is situated in the area of the top frame segment 7, in which a slider runs, being fastened to the vertex of the blind sheet 21. The slider can be operated by pull-cables through an electric motor, as is known in the art, and therefore, once again, it does not need to be described here.

Finally, it should be understood that the guide rail can be provided with a guide piece for manual operation as well, and by additionally providing a brake, it is possible to hold the blind sheet 21 in any desired pull-out position in the guide rail.

From the foregoing, it can be seen that the side window roller blind of the present invention has a winding shaft, which is coupled via an articulated/flexible coupling mechanism to a spring drive, which is situated outside the winding shaft. The winding shaft and the spring drive are accommodated inside the vertical window frame segment of a motor vehicle's window. The articulated/flexible coupling between the winding shaft and the spring drive makes it possible to approximate a curved path by means of these two substantially straight elements of a blind. Furthermore, a very flat tension characteristic curve can be achieved for the spring drive, even when the winding shaft is very short.

The invention claimed is:

1. A motor vehicle comprising:
 a side window surrounded by a window frame (3), said window frame (3) having a top edge (7) and a side edge (6) which together border an inner corner (8) of the side window;
 a winding shaft (25) arranged adjacent said window frame side edge (6) with one end adjacent said top edge (7);
 a blind sheet having at one edge secured to said winding shaft (25);
 a spring drive including a helical spring (39) for tensioning the winding shaft (25) in the direction of winding up of the blind sheet (21) onto the winding shaft (25),
 said helical spring (39) being arranged entirely outside the winding shaft (25) in outwardly extending relation to an end of the winding shaft (25);
 said helical spring (39) having a fixed end (41) and a take-off end (42) adjacent to the winding shaft (25);
 said helical spring (39) having an axis that forms an angle other than 180° with the axis of said winding shaft; and
 a coupling mechanism (27) connecting the take-off end (42) to the winding shaft (25) for enabling the helical spring (39) to drive the winding shaft while selectively mounted with their axes at an angle other than 180° to each other.

2. The motor vehicle of claim 1 in which said winding shaft has a length shorter than the length of said window frame side edge (6).

3. The motor vehicle of claim 2, in which said winding shaft (25) has a length between 20% and 40% of the length of the window side edge (6).

4. The motor vehicle of claim 1, in which said winding shaft (25) has the shape of a truncated cone.

5. The motor vehicle of claim 4, in which a smaller end of the truncated shaped winding shaft (25) is facing the top window frame edge (7).

6. The motor vehicle of claim 1, in which said blind sheet (21) has a shape of approximately an acute triangle.

7. The motor vehicle of claim 1, in which said winding shaft (25) is housed inside said window frame (3).

8. The motor vehicle of claim 1, in which said side window (5) is a front side window of a motor vehicle.

9. The motor vehicle of claim 1, in which said window frame (3) has an anchoring mechanism at a location away from the winding shaft (25) for enabling the blind sheet to be retained in an extended position.

10. The motor vehicle of claim 9, including an anchoring mechanism (47) on the blind sheet (21) for enabling the blind sheet to be retained in an extended position.

11. The motor vehicle of claim 1, including a handle (22) on the blind sheet (21) for enabling the blind sheet to be pulled to an extended position.

12. The motor vehicle of claim 1, in which said helical spring (39) has a length greater than the length of the winding shaft (25).

13. The motor vehicle of claim 1, in which said helical spring (39) is contained within a housing (35).

14. The motor vehicle of claim 13, in which said housing (35) has a tubular shape.

15. The motor vehicle of claim 13, in which said housing (35) has a closed, fluid-tight, bottom opposite said take off end.

16. The motor vehicle of claim 13, in which said housing (35) is at least partly filled with a dampening fluid.

17. The motor vehicle of claim 1, in which said take-off end (42) of the helical spring (39) has a bearing piece (43) rotatingly mounted in said housing.

18. The motor vehicle of claim 1, in which said coupling mechanism (27) is articulated coupling device.

19. The motor vehicle of claim 1, in which said coupling mechanism (27) has a catch (45) rigidly connected to the winding shaft (25) and a catch (46) rigidly connected to the take-offend (42) of the helical spring (39), and said catches (45, 46) being interengageable.

20. The motor vehicle of claim 19, in which one of said two catches (45, 46) is a hook.

21. The motor vehicle of claim 19, in which said one of said two catches (45, 46) is an eyelet.

22. The motor vehicle of claim 1, in which said coupling mechanism (27) comprises a flexible shaft or a Cardan joint.

23. A side window roller blind for use in a motor vehicle having a side window surrounded by a window frame (3) having a top edge (7) and a side edge (6) which form an inner corner (8), comprising a winding shaft (25) for mounting adjacent a window frame side edge (6) with an end adjacent said top edge (7);

a blind sheet having at one edge secured to said winding shaft (25);

a spring drive including a helical spring (39) for tensioning the winding shaft (25) in the direction of winding up of the blind sheet (21) onto the winding shaft (25), said helical spring (39) being arranged entirely outside the winding shaft (25) in outwardly extending relation to an end of the winding shaft (25);

said helical spring (39) being a fixed end (41) at one end and having a take-off end (42) at an opposite end adjacent to the winding shaft (25);

said helical spring (39) having an axis that forms an angle other than 180° with the axis of said winding shaft; and a coupling mechanism (27) connecting the take-off end (42) to the winding shaft (25) for enabling the helical spring (39) to drive the winding shaft from a location axially outside the winding shaft while selectively mounted with their axes at an angle other than 180° to each other.

24. The motor vehicle of claim 23, in which said wind up shaft has a length shorter than the length of said window frame side edge (6).

25. The motor vehicle of claim 23, in which said winding shaft (25) has the shape of a truncated cone.

26. The motor vehicle of claim 25, in which said coupling mechanism (27) has a catch (45) rigidly connected to the winding shaft (25) and a catch (46) rigidly connected to the take-offend (42) of the helical spring (39), and said catches (45, 46) being interengageable.

27. The motor vehicle of claim 19, in which one of said two catches (45, 46) is a hook and one of said two catches (45, 46) is an eyelet.

28. The motor vehicle of claim 12 in which said helical spring has an axial length of more than twice the length of said winding shaft.

* * * * *